UNITED STATES PATENT OFFICE.

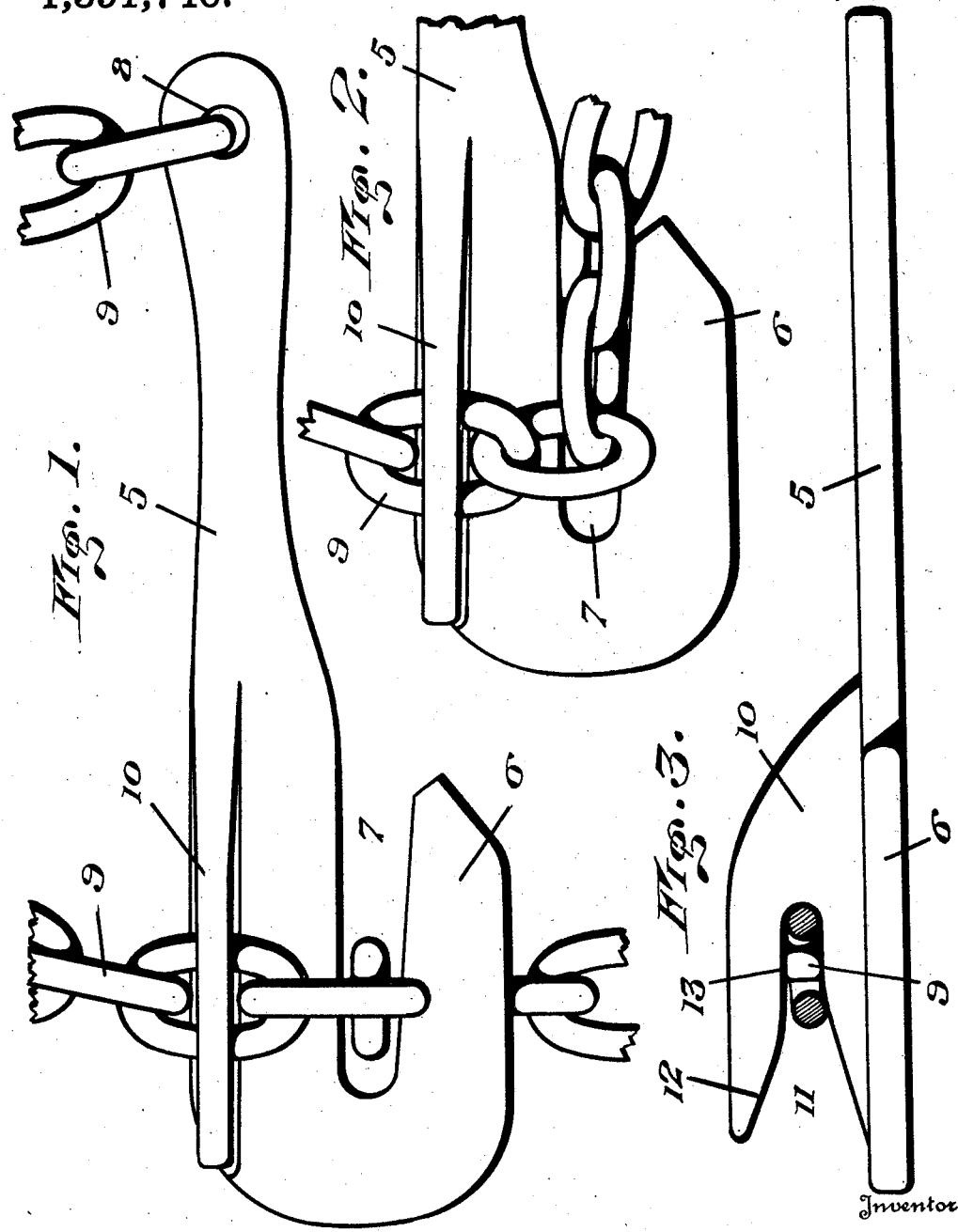

ALBERT W. McGUIRE, OF CARMEL, MAINE.

GRAB-HOOK.

1,391,746.   Specification of Letters Patent.   Patented Sept. 27, 1921.

Application filed June 24, 1920. Serial No. 391,387.

*To all whom it may concern:*

Be it known that I, ALBERT W. MCGUIRE, a citizen of the United States, residing at Carmel, in the county of Penobscot and State of Maine, have invented certain new and useful Improvements in Grab-Hooks; and I do hereby declare the following to be a full, clear, and exact description of the invention, such as will enable others skilled in the art to which it appertains to make and use the same.

The present invention relates to chain hooks, such as grab hooks used in logging and the like, and the invention has for its object the provision of a hook having novel and effective means for engaging the links of a chain in such a manner as to prevent the accidental disconnection of the hook and chain, which not infrequently happens with the use of the ordinary grab hooks, and sometimes endangering life or limb, or resulting in damage or injury.

The object of the invention is the provision of a hook having at its bill means also engageable with the chain for preventing the accidental disengagement of the chain from the bill of the hook, providing a safe hook, which will remain in engagement with the chain until the parts are manually disconnected.

It is also the object to provide such a hook of extremely simple and inexpensive construction, comprising only a single part, and which is nevertheless thoroughly practical and efficient in use.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a plan view of the hook showing the chain engaged therewith.

Fig. 2 is a similar view, a portion of the hook being broken away, and the chain being shown in the position as when moved into and out of engagement with the bill.

Fig. 3 is an edge view of the hook, showing the chain in section.

The hook comprises a shank 5, having the bill 6 at one end, with a relatively narrow tapered slot 7 between the bill and shank, and said shank and bill as shown, are flat. The shank 5 is provided with an aperture or eye 8 at its other end with which the end of the chain 9 is engaged. This chain is usually passed or wrapped around the log or other object and then engaged with the bill of the hook for hauling, dragging, lifting or otherwise handling the log or object. With ordinary hooks, the slackening of the chain at times will result in the hook and chain becoming disengaged, resulting in actual or threatened damage.

In carrying out the invention, the shank 5 is provided at one side with a longitudinal flange or portion 10 at an angle therewith and substantially parallel with the bill 6 at the opposite side of the slot 5. This flange 10 has a slot 11 extending longitudinally therein and opening at the end of the flange 10 opposite to the end of the bill 6. In other words, the slots 7 and 11 open in opposite directions, and the slot 11 has a tapered mouth 12 leading to a portion 13 of restricted width to snugly receive the link of the chain which is inserted in said slot. Both slots 7 and 11 are sufficiently narrow to prevent the passage of the links of the chain therethrough when disposed transversely of said slots, thereby preventing the chain pulling through said slots when the links of the chain are disposed within the slots substantially parallel with the edges thereof. The slots 7 and 11 are in overlapping relation for the direct passage of the chain through the slots, as seen in Fig. 1.

In applying the chain to the hook, after being passed or wrapped around the log or other object, the link of the chain is moved into the slot 11 and seated in the portion 13 thereof. The chain is then passed through the slot 7, the links being turned as nearly as possible into a common plan so as to pass through the slot 7. The chain is then pulled to bring the corresponding link thereof to the closed end of the slot 7 at the bight of the hook or bill. The flange or reversed hook 10 will therefore prevent the chain from moving out of engagement with the bill 6, so that there is no possibility for the hook and chain being disconnected accidentally, even though subjected to rough usage. However, by slackening the chain and turning the links thereof by hand, so that they can be passed through the slot 7, as seen in Fig. 2, the chain is readily disconnected from the hook by hand and then can be readily pulled out of the slot 11. The shank 5 thus has reversed hooks in overlapping relation with the slots opening in opposite directions, whereby the chain in being engaged with said hooks will result in each hook preventing the chain from moving out of engagement with the other hook, unless the hooks are manipulated in a predetermined manner by hand, in which event the chain and hook can be readily disconnected.

The hook is composed of a single piece of metal, and can be readily and inexpensively manufactured.

Having thus described the invention, what is claimed as new is:—

1. A chain hook comprising a shank having an eye at one end and a bill at the opposite end with a chain-engaging slot between said bill and shank opening in a direction toward the firstnamed end of the shank, said shank being provided at that side of said slot opposite to said bill with a substantially longitudinal flange at one side of the shank and at an angle therewith, said flange having a longitudinal slot in overlapping relation with the aforesaid slot and opening in a direction away from the firstnamed end of said shank.

2. A chain hook comprising a shank having an eye at one end and a bill at the opposite end with a chain-engaging slot between said bill and shank opening in a direction toward the firstnamed end of the shank, and the hook having a substantially longitudinal flange at one side at an angle therewith and at one side of the aforesaid slot, said flange having a longitudinal slot opening in a direction away from the firstnamed end of said shank to receive the chain engaged within the firstnamed slot, both of the slots being sufficiently narrow to prevent passage of the links of the chain therethrough when disposed transversely of said slots, and requiring the slackening of the chain and the turning of the links to remove them from said slots.

In testimony whereof I have signed my name to this specification in the presence of two subscribing witnesses.

ALBERT W. McGUIRE.

Witnesses:
HOWARD M. COOK,
AGNES F. CURRAN.